No. 624,357. Patented May 2, 1899.
A. A. MARSH.
WEED TURNER FOR PLOWS.
(Application filed Jan. 12, 1897.)
(No Model.)
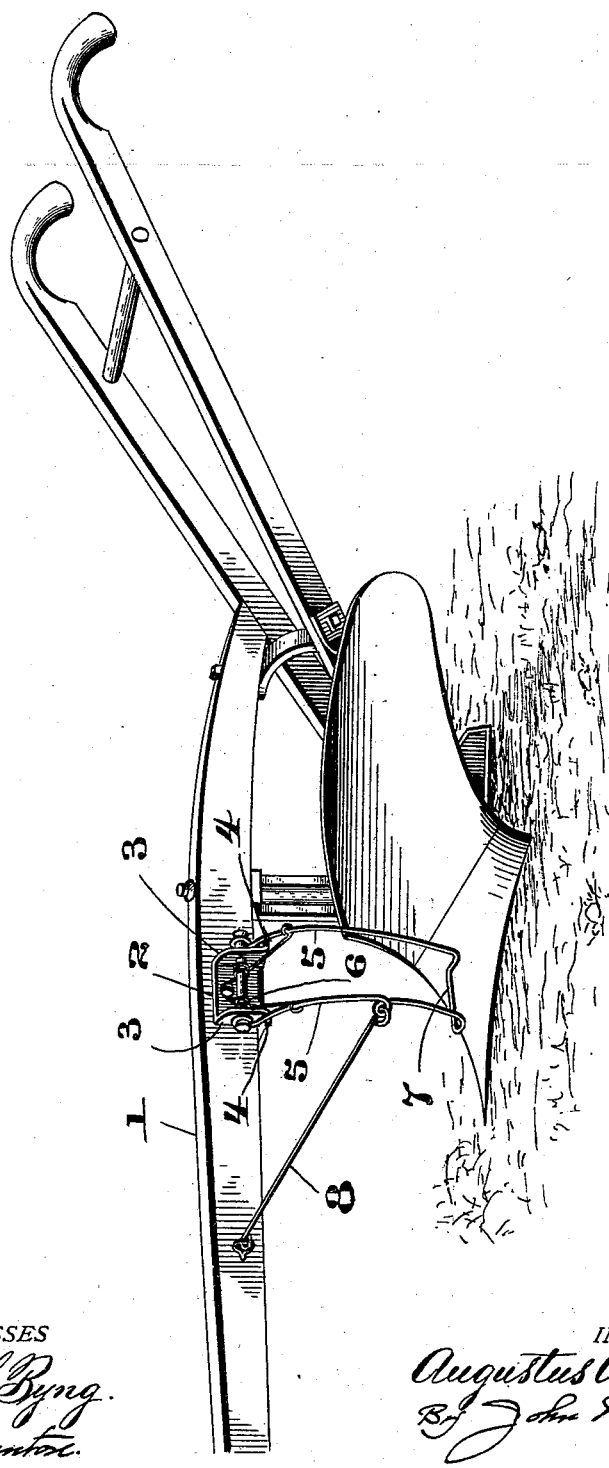
WITNESSES
INVENTOR
Attorney

UNITED STATES PATENT OFFICE.

AUGUSTUS A. MARSH, OF ORLANDO, FLORIDA.

WEED-TURNER FOR PLOWS.

SPECIFICATION forming part of Letters Patent No. 624,357, dated May 2, 1899.

Application filed January 12, 1897. Serial No. 618,916. (No model.)

*To all whom it may concern:*

Be it known that I, AUGUSTUS A. MARSH, a citizen of the United States, residing at Orlando, in the county of Orange and State of Florida, have invented certain new and useful Improvements in Weed-Turners for Plows; and I do hereby declare the following to be a full, clear, and exact description of the invention, such as will enable others skilled in the art to which it appertains to make and use the same.

This invention has reference to a novel construction in an attachment for plows that is employed for turning weeds and the like into the cut furrow; and it consists in the features of construction hereinafter fully described and claimed.

The accompanying drawing is a perspective view of a plow constructed in accordance with this invention.

Referring now to said drawing, 1 indicates the beam of the plow, to the moldboard side of which is secured a bracket 2. Said bracket consists of a central plate having the forwardly-extending ears 3. These ears 3 are apertured and are provided with laterally-extending lugs 4, upon which the side portions of the arm 5 bear to limit the movement thereof.

The weed-turner consists of an arm 5, that is pivoted by means of a pivot passing through the ends of the same and through the apertured ears 3. The said arm 5 is curved, and a spring 6 is employed for holding said arm downwardly and upon the lugs 4. The outer end of the arm is turned inwardly, as shown at 7, while a brace-rod 8 is secured to said rod and extends forwardly and is fastened to the beam. From the foregoing description it is seen that this spring-actuated weed-turning arm will be held under tension against the furrow as it is being turned and will consequently and in connection with the brace-rod turn the weeds downwardly into the cut furrow, so that the said weeds will be completely covered and turned beneath the dirt as it is turned by the plow.

It is seen that the device is simple and inexpensive and can be readily attached to the plow-beam without especial preparation therefor.

Having thus described my invention, what I claim as new, and desire to secure by Letters Patent, is—

1. The combination with a bracket, of a shaft therein extending parallel with the plow-beam, a weed-turner formed of a single piece of wire with its ends secured around said shaft, and a spring having a portion coiled around said shaft and secured to the bracket and its ends secured to the side portions of the weed-turner, substantially as described.

2. The combination with a plow-beam and a bracket secured thereto and having lateral lugs at its lower edge, of a shaft supported in said bracket, a weed-turner supported on said shaft, and a spring having its ends secured to the side portions of the weed-turner and a portion coiled around said shaft and secured to the bracket, substantially as specified.

3. The combination with a plow-beam and a bracket secured thereto, of a weed-turner supported on said bracket on a horizontal shaft with its lower cross portion turned inward, a spring acting upon the turner, and a brace attached to the plow-beam and to an eye formed on one of the side portions of the weed-turner, all substantially as shown and described.

In testimony whereof I have signed this specification in the presence of two subscribing witnesses.

AUGUSTUS A. MARSH.

Witnesses:
I. B. T. TUPPER,
F. A. CURTIS.